Figure 1:
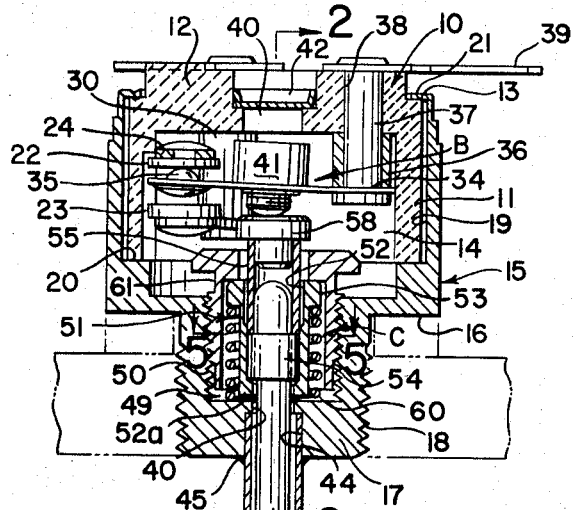

March 21, 1967 D. E. PLACE 3,310,647
TEMPERATURE SENSING PROBE WITH MEANS FOR MAINTAINING
THE TUBULAR ELEMENT IN ENGAGEMENT WITH
A CERAMIC ROD MEMBER
Filed March 22, 1965

INVENTOR.
DONALD E. PLACE
BY McCoy, Greene,
Medert & Te Grotenhuis
ATTORNEYS

United States Patent Office 3,310,647
Patented Mar. 21, 1967

3,310,647
TEMPERATURE SENSING PROBE WITH MEANS FOR MAINTAINING THE TUBULAR ELEMENT IN ENGAGEMENT WITH A CERAMIC ROD MEMBER
Donald E. Place, Mansfield, Ohio, assignor to Therm-O-Disc, Incorporated, Mansfield, Ohio, a corporation of Ohio
Filed Mar. 22, 1965, Ser. No. 441,716
5 Claims. (Cl. 200—137)

This invention relates to temperature sensing probe devices and more particularly to an improved heat responsive probe device for use as switch actuating means wherein the probe is adapted to be positioned in the fuel flame of heating appliances such as furnaces, cooking ranges, and clothes driers.

The improved temperature sensing probe of the present invention fulfills a desirable function in connection with the device described and claimed in my copending application entitled, "Thermo-Switches," filed on July 31, 1962, and bearing Serial No. 213,767, now Patent No. 3,194,-927, dated July 13, 1965, and will be hereinafter described in connection with the device of said application.

Heretofore, various types of temperature sensing probes have been provided employing a rod and tube assembly. For example, such probes have included tubes and rods made of metals of different coefficients of thermal expansion and secured together by welding or other suitable means at one end. When subjected to temperature changes the relative movement between the rod and tube was employed to actuated switch means to control the operation of appliances such as furnaces, ranges, and clothes driers. So long as the temperature to which the probe was subjected did not exceed a predetermined amount the structure was satisfactory. However, as pointed out in my copending application Ser. No. 213,767, now Patent No. 3,194,927, probes have a tendency to undergo changes in physical characteristics after extended periods of exposure to a flame or other source of heat. Thus, prior probes had a definite limitation of use where high temperatures were concerned.

In order to meet the demand for probes which would withstand relatively high temperatures over extended periods of time, it was deemed necessary to resort to a rod material which would give the desired results in this respect. Although it was recognized that nonmetallic materials had the desired heat resisting characteristics, the problems presented in assembling a probe of such materials capable of functioning in a manner similar to the probe disclosed in my said application appeared to preclude their use. The prior practice of welding the rod and tube together to get the effect of relative movement therebetween upon temperature change could not be used where the rod was composed of a material incapable of being welded.

The present invention provides a temperature sensing probe which includes a metallic tubular member having a rod member mounted therewithin which is composed of a ceramic material having a different coefficient of thermal expansion than the tubular member and the rod and tubular members are so secured together that any movement of the tubular member is translated to the rod for use in operating switch elements of a device for controlling the operation of an appliance.

A method is provided herein of securing the rod within the tube without the necessity of welding the rod to the tube, thus a rod can be made of any desirable material capable of fulfilling the requirements of the probe. The probe herein provided is particularly useful when the temperatures to be sensed are so great as to make necessary or desirable the use of a rod constructed from a ceramic material.

In making a temperature sensing probe in accordance with the present invention, a metallic tube having the desired characteristics is provided, which is open at its outer end to permit the insertion of a ceramic rod. The rod has a flanged end portion larger than the inner diameter of the tube thereby providing a tube engaging surface. A cap member is placed over the flanged portion of the rod and then welded or secured by other means to the exterior wall of the tube. By exerting pressure against the rod in the direction of the tube, the cap when secured prevents relative movement of the rod at the engaging surfaces therebetween.

Figure 3:
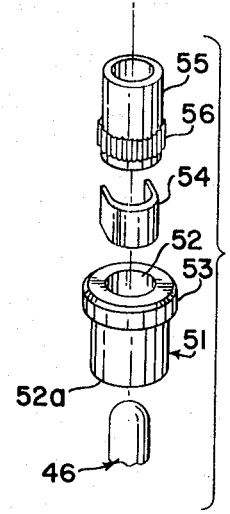
Figure 4:
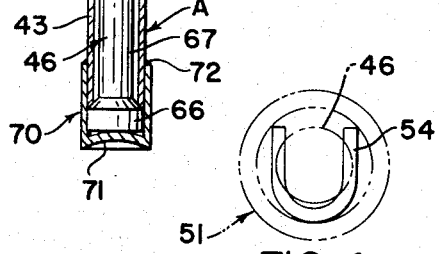
Figure 6:
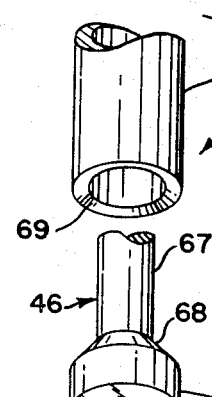
Figure 7:
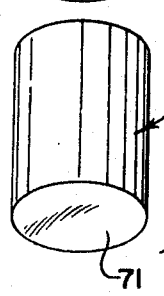
Figure 2:
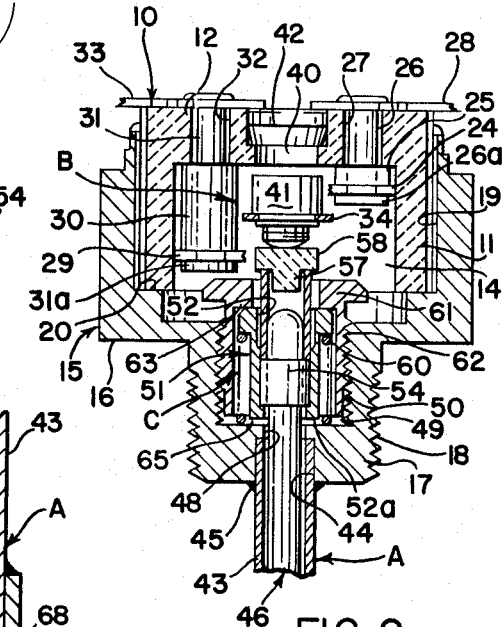

Various objects and advantageous features of the invention, not at this time more particularly pointed out will become apparent as the nature of the invention is better understood from the following detailed description taken in conjunction with the accompanying drawings wherein like reference characters denote corresponding parts and wherein:

FIGURE 1 is a longitudinal medial sectional view of a thermo-switch embodying a temperature sensing probe made in accordance with the teachings of the present invention showing the switch contacts in normal position prior to application of heat, FIGURE 2 is a longitudinal sectional view of the thermo-switch shown in FIGURE 1, taken along the line 2—2 of FIGURE 1 and also showing the switch contacts in normal position prior to the application of heat to the probe, FIGURE 3 is an exploded perspective view illustrating the elements of the frictionally controlled actuating member of the thermo-switch shown in FIGURE 1, FIGURE 4 is a sectional view of the actuating assembly prior to the insertion of the temperature sensing rod, FIGURE 5 is a horizontal sectional view taken along the line 5—5 of FIGURE 1, FIGURE 6 is an exploded perspective view of the end of the tube, the end of the rod, and the cap to be placed over the rod and tube, and FIGURE 7 is an enlarged fragmentary sectional view of the lower end of the probe shown in FIGURE 1.

With reference to the drawings, the probe assembly "A," of the present invention, is illustrated in connection with a thermo-switch which embodies a switch proper "B" including a pair of fixed contacts and a mobile contact, adapted to move therebetween, and an actuating assembly "C" which co-ordinates the movements of the elements of the assembly A in response to the presence or absence of a source of heat applied to the latter or the influence of temperature changes thereon.

The switch proper B in itself is somewhat of conventional construction. The elements of the actuating assembly C which serve to control the movement of the switch contacts in response to movement of the elements of the assembly A, constitute an arrangement for translating the movement which takes place between the elements of assembly A in response to the presence or absence of a source of heat or the reduction in the amount of heat within the chamber surrounding the assembly A, as disclosed in my said application Ser. No. 213,767, now Patent No. 3,194,927.

The switch proper B as stated above, of conventional structure, is embodied within a housing 10 which may be of a suitable insulating material, although under certain applications of the switch device, it may be desired to construct the housing of a material which will withstand extremely high temperatures, such being the case when the switch would be placed in close proximity to either the pilot frame or main burner of a heating appliance. The housing 10 is generally of inverted cup-shaped configuration having a side wall 11 and an upper end wall 12. The side wall 11 is offset inwardly adjacent its upper end to form an annular ledge 13. As shown in FIGURES 1 and 2, the housing 10 presents a generally cylindrical downwardly facing switch chamber 14.

The switch housing 10 is supported by a cup-shaped metal case 15 having a side wall which is hexagonal in its exterior form (not shown) to receive a suitable wrench for applying the device to an appliance. The lower end of the side wall is turned in laterally to form a horizontal annular wall portion 16. At its lateral inward extremity, the annular horizontal wall portion 16 is joined to a cylindrical plug-like projection 17 which is suitably threaded as at 18 to be received in a tapped opening in a wall of an appliance with which the control is adapted to be used. The metal case 15 presents a generally cylindrical interior side wall 19 which is inset laterally at its lower extremity to provide a supporting surface 20 for the end surface of the side wall 11 of the housing 10. The side wall 19 snugly surrounds the outer wall of the housing 10 and terminates in a plurality of tangs 21 which are arranged to be bent over and engage the annular ledge 13 to secure the housing and case in assembled relation.

Mounted within the switch chamber 14 are stationary contact members 22 and 23. The contact member 22 is mounted on the outer free end of an arm 24, the end of which is supported on the lower surface of a spacer sleeve 25. A terminal post 26 having a headed end 26a extends through the arm 24, spacer sleeve 25, and opening 27 in the end wall 12 of the housing 10 and is secured to a blade terminal 28 positioned on the outer surface of the bottom wall 12 of the housing. Similarly, the stationary contact 23 is mounted on the outer end of an arm 29 which is supported on the lower surface of a spacer sleeve 30. A terminal post 31 having a head 31a extends through the arm 29, sleeve 30, and an opening 32 in the end wall 12 of the housing and is secured to a blade terminal 33 projecting outwardly from the outer surface of the control.

A moveable contact carrying arm 34 (FIGURE 1) carries at its outer free end mobile contact 35 which presents a rounded surface on the top of the arm 34 to the stationary contact 22 and a similar surface below the arm 34 to the stationary contact 23. The opposite end of the arm 34 is mounted on bushing 36 which is supported on a headed terminal post 37 extending through an opening 38 in the end wall 12 of housing 10 and secured to blade terminal 39. The central portion of the end wall 12 is bored and counter-bored as at 40 to provide access to the switch chamber 14 for effecting adjustment of a bumper member 41 threaded through the mobile contact carrying arm 34. A closure member 42 is seated in the counter-bore of the bore 40.

The temperature sensing probe assembly A of the present invention comprises an elongated tube 43, the upper end of which seats within a bore 44 extending axially into the projection 17 of the case 15 from the lower surface thereof. The tube 43 is securely fixed to the case 15 by means of welding as at 45. The tube 43 is preferably made of stainless steel or other suitable metal having a relatively high coefficient of expansion and has mounted therein an elongated rod 46 preferably made of a ceramic or similar non-weldable material, one end of which is secured in the lower end of the tube 43 in a manner to be described hereinafter and extends upwardly therefrom through the tube 43 in concentric relation therewith. The rod 46 extends upwardly through an opening 48 into an enlarged cylindrical chamber 49 formed within the projection 17, in which are mounted the elements of the actuating assembly C for translating movement of rod 46 with respect to the tube 43, responsive to temperature changes, to actuate the switch elements. The side wall of the chamber 49 is suitably threaded as at 50.

The assemblage C comprises a cylindrical clutch housing 51 having an internal bore 52 formed with an inwardly extending flange 52a adjacent its lower end and an outwardly extending peripheral flange 53 adjacent the other end thereof which serves as a restraining collar. The housing 51 receives the upper end of the rod 46 projecting into the chamber 49. Mounted within the lower end of the housing 51 and seated on the flange 52a is a U-shaped spring member 54 which is arranged to encircle the rod 46. When assembled, the inner wall of the housing 51 exerts bending pressure on the legs of the U-shaped member 54 as shown in FIGURE 5 causing the same to frictionally grip the exterior surface of rod 46 therebetween. The spring member 54 is maintained within the clutch housing 51 seated on the ledge 52a by means of a sleeve 55 having the lower exterior surface suitably knurled as at 56, the knurled surface 56 being pressed into the wall surface of the bore 52 of the housing 51 to secure the two elements together. The upper end of the sleeve 55 projects beyond the housing 51 and receives the shank portion 57 of a plug member 58, the upper surface of which is arranged to engage the lower end of the adjustable bumper member 41 carried by the mobile contact carrying arm 34.

Disposed between the bottom wall of the chamber 49 and the lower surface of the collar 53 of the housing 51 and encircling the same is a coil spring 60 which serves to urge the clutch housing upwardly. The clutch assembly is adjustably mounted within the chamber 49 by means of the bushing 61 engages the top of the clutch housing 51 are received by the threads 50 formed on the chamber wall. The internal shoulder 63 formed on the upper end of the bushing 61 engages the top of the clutch housing 51 and adjustably positions the lower edge surface thereof with respect to the bottom surface of the chamber 49 against the force of the spring 60.

In the operation of the device, the switch contacts and elements of assembly C are in the position shown in FIGURE 2 when the device is under normal room temperature. The mobile contact 35 is maintained in engagement with the fixed contact 22 through upward pressure of the clutch assembly positioned on the rod 46. The gap 65 between the lower end surface of the clutch housing 51 and the bottom surface of the chamber 49 has been predetermined and adjusted by means of the threaded connection between the bushing 61 and the wall of chamber 49. The bias of the mobile contact arm 34 to separate the contacts 22 and 35 has been overcome by bringing the end of the adjustable bumper member 41 into contact with member 58.

The device is then in condition to be mounted on an appliance, for example, the temperature sensing assembly "A" is inserted into the combustion chamber of a furnace so that the pilot flame of the device plays or impinges upon the assembly. When the assembly "A" is exposed to the flame of the pilot, the tube 43 will expand lengthwise downwardly as shown in FIGURE 1. Such downward movement of the tube 43 withdraws the rod within the chamber 49 and moves assembly "C" downwardly against the upward pressure of spring 60 until the lower end surface of the housing 51 bottoms on the lower surface of chamber 49. This downward movement relieves the pressure on the bumper 41 and the bias of the contact carrying arm 34 breaks engagement between contact 22 and contact 35 and moves the mobile contact 35 into engagement with the fixed contact 23 and closes the circuit to the fuel control valve. The movement of rod 46 will continue due to further expansion of the tube 43 and will move relative to the U-shaped friction member 54. In the event that the flame of the pilot, or the burner flame should be extinguished or in the event of any unusual drop in temperature surrounding assembly "A" the tubular member 43 will react quickly and any slight reverse movement due to such reduction in temperature is immediately reflected through the rod 46 and assembly "C" which thereupon moves upwardly carrying the plug member 58 into engagement with the lower end of adjustable bumper member 41. The mobile contact arm 34 is moved against the downward bias of the arm and mobile contact 35 is caused to engage fixed contact 22. Continued cooling of the tube 43 and a return to room temperature will effect a relative movement between the frictional gripping member 54 and the end of rod 46 so that the relative positioning of the parts in assembly C will return to that as shown in FIGURE 1 where contacts 35 and 22 are maintained in engagement against the bias of the arm 34 and any slight heating of the tube 43 will cause immediate downward movement of the contact arm 34 and effect a break between the fixed contact 22 and mobile contact 35.

In the normal use of heat sensing probe assemblies continual impingement of a heating flame on the tube 43 will effect a change in the physical character of the elements of the assembly, for example, there is a tendency, due to what is known as carbon growth, for the tube to be permanently elongated. Such elongation in the tube would be taken up in the slippage between the friction member 54 and rod 46. Thus, there is always relative movement between the rod and tube upon the flame being removed from the tube or temperature being substantially decreased in the area surrounding the tube and the contraction of the tube would be effective to cause the rod through assembly C to move the mobile contact carrying arm of the switch.

In other instances, the continual impingement of a gas flame upon the tube may cause deterioration of the tube member and eventually brings about a condition where the tube and rod separate. Under such condition, the spring member housed within the assembly C is brought into play to exert pressure through the sleeve member 55 to cause bumper member 58 to exert pressure on the mobile contact carrying arm to close the contacts 35 and 22. Thus, upon the absence of a flame or upon a breakage of the elements of the temperature sensing assembly A or the ineffectiveness of the elements thereof to close the switch, assembly "C" is effective to open contacts 35 and 23 of the switch mechanism.

It will be apparent from the foregoing description that the successful operation of the switch requires that the rod 46 be secured to the tube 43 at the outer end thereof. With reference to FIGURES 1, 6, and 7, there is shown structure for securing the ceramic rod 46 to the metal tube 43. Integrally formed on the end of the rod 46 is a cylindrical end flange portion 66 connected to the body portion 67 of the rod 46 by a tapered portion 68. The end of the tube 43 is counterbored to provide a surface 69 complemental to the tapered surface 68 connecting the flange 66 and body portion 67 as shown in FIGURE 6, a cap member 70 is provided to enclose the flanged end of the rod and the tube 43.

The tube 43, rod 46, and cap 70, are shown in assembled position in FIGURE 7. The internal diameter of the cap 70 is sufficient to permit the cap to be placed over the flanged end 66 of rod 46 and the exterior of tube 43. The end 71 of the cap 69 is curved inwardly to provide an axial force against the rod 46 so as to cause the flared portion 68 of rod 46 to bear firmly at all times against the surface 69 of the end of tube 43. The cap 70 is welded to the exterior wall of the tube 43 as at 72.

While there has been described herein and illustrated in the accompanying drawings, a presently preferred embodiment of the present invention, it is to be understood that various modifications, omissions, and refinements which depart from the disclosed embodiment may be adopted without departing from the spirit and scope of this invention as defined in the appended claims.

I claim:

1. A temperature sensing probe comprising a metallic tubular member having a relatively high coefficient of thermal expansion, a one piece ceramic rod member having an end portion with a diameter greater than the internal diameter of said tubular member mounted within said tubular member, means for securing the said end portion of the said rod member in engagement with the end surface of the tubular member comprising a cylindrical cap member enclosing the said end portion of greater diameter of the rod member and the end of said tubular member, said cap member secured to the exterior wall of the tubular member at a point spaced from the end thereof.

2. A temperature sensing probe comprising a one piece ceramic rod member having an elongated body portion and an end portion of increased diameter, a tubular member enclosing the body portion of the rod member made of a metal having a relatively high coefficient of thermal expansion as compared to said rod member, the end surface of the tubular member engaging the end surface of the portion of increased diameter on said rod member, a cylindrical cap enclosing the said end portion of the rod member and the end of the tubular member and maintaining said members in engagement, said cap member being secured to the exterior wall of the tubular member at a point spaced from the end thereof.

3. A device as defined in claim 2, wherein the diameter of the end portion of the rod member and the outside diameter of the tubular member are substantially the same.

4. In a thermostatic switch including a housing defining a switch chamber, a switch mounted in said chamber embodying a stationary contact, a mobile contact and a cantilever mounted arm for supporting said mobile contact; a heat responsive probe projecting from said housing including a ceramic rod member having an elongated body portion and an enlarged end portion, a metallic tubular member surrounding said body portion with the end surface thereof engaging the enlarged end portion on the rod member, a cylindrical cap enclosing the end portion of the rod member and the end of the tubular member and maintaining said members in engagement, said cap secured to the exterior wall of the tubular member at a point spaced from the end thereof, the other end of said rod member projecting into said housing for actuating said mobile contact.

5. A device as defined in claim 4 wherein means are provided for translating relative movement between said tubular member and said rod member to said cantilever mounted arm, said translating means including a friction member serving to grip the rod member, and means biasing said translating means into engagement with said cantilever mounted arm.

References Cited by the Examiner

UNITED STATES PATENTS

| | | | |
|---|---|---|---|
| 2,418,068 | 3/1947 | Cornelius | 200—67 |
| 2,705,746 | 4/1955 | Strange | 200—137 |
| 2,799,748 | 7/1957 | Stump | 200—137 |
| 3,004,123 | 10/1961 | Cannon | 200—137 |
| 3,194,927 | 7/1965 | Place | 200—137 |
| 3,212,337 | 10/1965 | McCarrick | 200—137 X |

BERNARD A. GILHEANY, *Primary Examiner.*

T. MACBLAIN, H. A. LEWITTER, *Assistant Examiners.*